G. W. COX.
JOINT FOR PITCHFORKS AND THE LIKE.
APPLICATION FILED DEC. 15, 1913.

1,120,449.

Patented Dec. 8, 1914.

WITNESSES:
Frank C. Ward
Marion E. McCaffrey

INVENTOR
George W. Cox
BY
Millard Eddy
ATTORNEY

UNITED STATES PATENT OFFICE.

GEORGE W. COX, OF EDISON, NEBRASKA.

JOINT FOR PITCHFORKS AND THE LIKE.

1,120,449.     Specification of Letters Patent.     Patented Dec. 8, 1914.

Application filed December 15, 1913. Serial No. 806,679.

*To all whom it may concern:*

Be it known that I, GEORGE W. COX, a citizen of the United States, residing at Edison, in Furnas county, in the State of Nebraska, have invented certain new and useful Improvements in Joints for Pitchforks and the like, and have described the same in the following specification, illustrated by the accompanying drawings.

My invention relates to that class of rigid joints which are formed by means of ferrules and are commonly used for uniting the separately formed head and handle of individual agricultural tools, such as pitchforks, hand rakes, cob scoops, potato forks, and the like.

It is the object of the invention to render joints of this class strong, durable and easy of repair, in a greater degree than are those heretofore constructed; and in general to increase the efficiency of such joints. To accomplish this result I incorporate in my improved joint an annular metallic plug, which is seated in the ferrule of the handle, and is secured to the head of the tool by a bolt.

Figure 1:
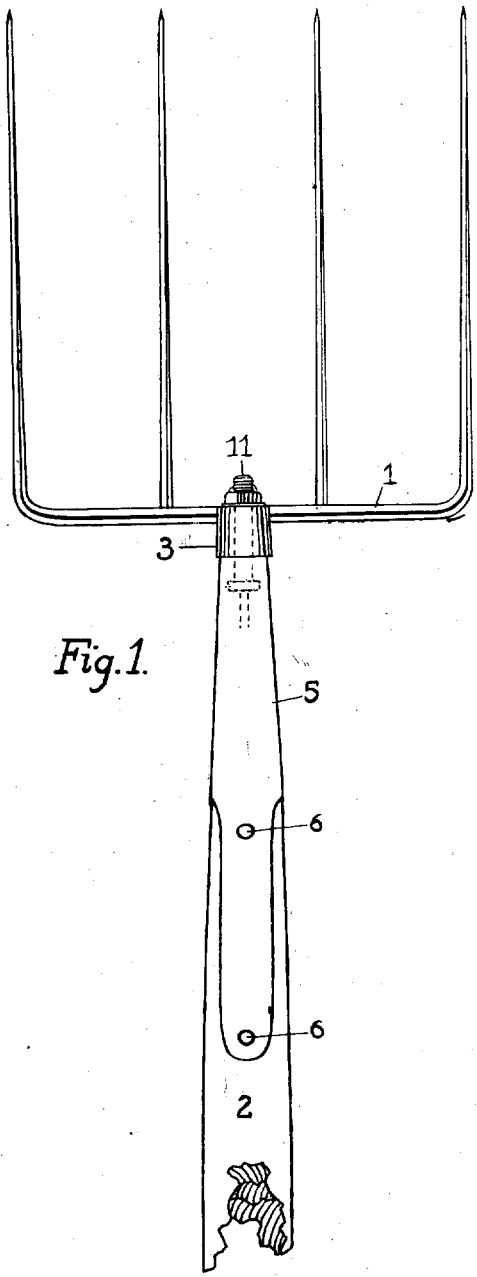
Figure 2:
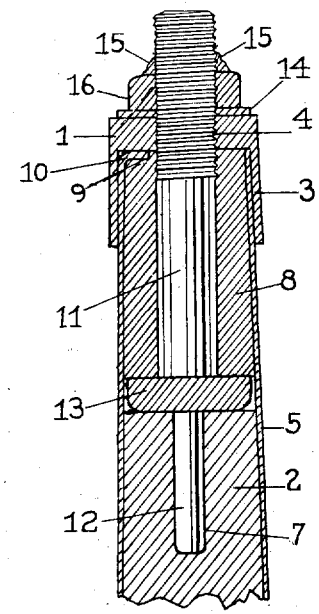

In said drawings, illustrating the best manner in which I have contemplated applying the principles of the invention, Figure 1 is a front elevation of a pitchfork which is constructed in accordance with these priniciples. Fig. 2 is a central axial section through the joint.

In this illustrative and illustrated specimen of my invention the metallic head and the wooden handle of the fork are denoted generally by the numerals 1 and 2 respectively. Integral with the head 1, and projecting rectangularly therefrom, is formed the cup-shaped and slightly tapering annular socket 3, co-axial with the central bolt-hole 4 in that head. The handle 2 is externally fitted into one end of the heavy sheet-metal ferrule 5, is secured thereto by the bolts 6, and has within the ferrule a central terminal pin-hole 7. In the small end of this ferrule is placed the close-fitting, annular, tapering steel plug 8. For convenience in assembling the parts, this plug has a terminal notch 9, to be occupied by the lip, or finger 10, which is part of the ferrule. The bolt 11, which occupies the plug, made hollow for its accommodation, has upon its head a pin-like extension 12, axial with the body of the plug, and occupying the pin-hole 7.

In assembling the device, the plug 8 is first dropped into the ferrule, the finger 10 being placed in the notch 9; then the bolt 11 is dropped into the plug, and into the bolt-hole 4, where it is stopped by its head 13 in the position shown; then the washer 14 and the nut 16 are placed upon the bolt 11; then, by turning this nut, the head 1, the plug 8, and the ferrule 5 are clamped rigidly and firmly together in the position shown; then the handle is forced endwise into abutting contact with the bolthead 13, within the ferrule, whereby the pin 12 is driven into the hole 7; and then the ferrule is firmly secured to the handle by the bolts 6. A small quantity of solder is applied to the exposed portion of the bolt 11 as a lock 15 to the nut 16.

So constructed, the joint is strong, durable and easy of repair, as above proposed.

I claim as my invention—

1. A joint of the specified class, comprising a metallic head having a bolt-hole and an integrally formed socket, a wooden handle having a terminal axial pin-hole, a ferrule secured to the handle and fitted into the socket, a tapering annular plug seated in the ferrule, a bolt inserted through the plug and through the bolt-hole, a nut for the bolt, and a pin extending from the head of the bolt into the pinhole.

2. A joint of the specified class, comprising a metallic head having a bolt-hole and an integrally formed socket, a handle having a terminal pin-hole, a ferrule secured to the handle and fitted into the socket, a plug seated in the ferrule, a bolt extending through the plug and the bolt-hole, a nut for the bolt, and a pin extending from the head of the bolt into the pin-hole.

3. A joint of the specified class, comprising a head having a tapering socket, a handle having a terminal axial hole, a tapering ferrule secured to the handle and occupying the socket, a tapering annular plug within the ferrule and partly within the socket, and a bolt engaging both the plug and the head and having an axial pin extending into the hole in the handle.

In testimony whereof I subscribe my name hereto in the presence of two witnesses.

GEORGE W. COX.

Witnesses:
  WILLARD EDDY,
  A. M. POWER.

Copies of this patent may be obtained for five cents each, by addressing the "Commissioner of Patents, Washington, D. C."